United States Patent [19]
Ozawa et al.

[11] Patent Number: 4,716,421
[45] Date of Patent: Dec. 29, 1987

[54] RECORDING APPARATUS

[75] Inventors: Kunitaka Ozawa, Isehara; Takashi Nakamura, Hiratsuka; Akira Katayama; Katsunori Hatanaka, both of Yokohama; Tetsuzo Mori, Hiratsuka; Makoto Takaoka, Atsugi, all of Japan

[73] Assignee: Canon Kabushiki Kaisha, Tokyo, Japan

[21] Appl. No.: 918,715

[22] Filed: Oct. 14, 1986

[30] Foreign Application Priority Data

Oct. 18, 1985 [JP] Japan ............................... 60-230963

[51] Int. Cl.[4] ............................................ G01D 15/18
[52] U.S. Cl. ................................ 346/140 R; 400/82; 400/126; 400/105.1
[58] Field of Search ............ 346/139, 140 R, 140 PD, 346/134; 400/82, 126, 196.1, 240.3, 240.4, 705.1

[56] References Cited

U.S. PATENT DOCUMENTS

| | | | |
|---|---|---|---|
| 4,403,874 | 9/1983 | Payne et al. | 400/124 |
| 4,540,996 | 9/1985 | Saito | 346/140 PD |
| 4,601,595 | 7/1986 | Aiba et al. | 400/705.1 X |
| 4,635,078 | 1/1987 | Sakurada et al. | 346/140 PD |

FOREIGN PATENT DOCUMENTS 48552 4/1979 Japan .

*Primary Examiner*—J. R. Scott
*Assistant Examiner*—Derek S. Jennings
*Attorney, Agent, or Firm*—Fitzpatrick, Cella, Harper & Scinto

[57] ABSTRACT

A recording apparatus, such as an ink jet printer, with plural recording heads is described. Each recording head has a mark which is read by a detector to generate a corresponding signal. The signals from plural recording heads are utilized for registering these heads.

15 Claims, 5 Drawing Figures

RECORDING APPARATUS

BACKGROUND OF THE INVENTION

1. Field of the Invention

The present invention relates to a recording apparatus for effecting a recording operation by a relative movement of a recording head with respect to a recording medium.

2. Related Background Art

In conventional recording apparatus equipped with plural recording heads, for example a color printer equipped with three recording heads for cyan (C), magenta (M) and yellow (Y), the positional registration among these recording heads is achieved by electrical or mechanical adjustments based on a printed test pattern.

However the mechanical adjustment of registration requires delicate operations which take a long time, except for an expert. Also the registration of the recording heads has to be adjusted each time a recording head is replaced.

An incomplete adjustment results in a positional aberration of images of different colors, thus significantly deteriorating the image quality.

SUMMARY OF THE INVENTION

In consideration of the foregoing, an object of the present invention is to provide a recording apparatus not associated with the drawbacks of the prior technology.

Another object of the present invention is to provide a recording apparatus allowing easy detection of the errors in registration of plural recording heads.

Still another object of the present invention is to provide a recording apparatus capable of compensating the detected errors in registration of plural recording heads, thereby enabling to an image of a high quality to be obtained.

Still another object of the present invention is to provide a recording apparatus provided with detection means for detecting a mark provided on each recording head and a reference mark provided on a carriage supporting said recording heads, operation means for calculating the distance of each recording head from said reference mark based on the output of said detection means, and control means for controlling the timing of recording of each recording head according to the output of said operation means.

The foregoing and still other objects of the present invention will become fully apparent from the following description, which is to be taken in conjunction with the attached drawings.

DETAILED DESCRIPTION OF THE PREFERRED EMBODIMENTS

Figure 1:
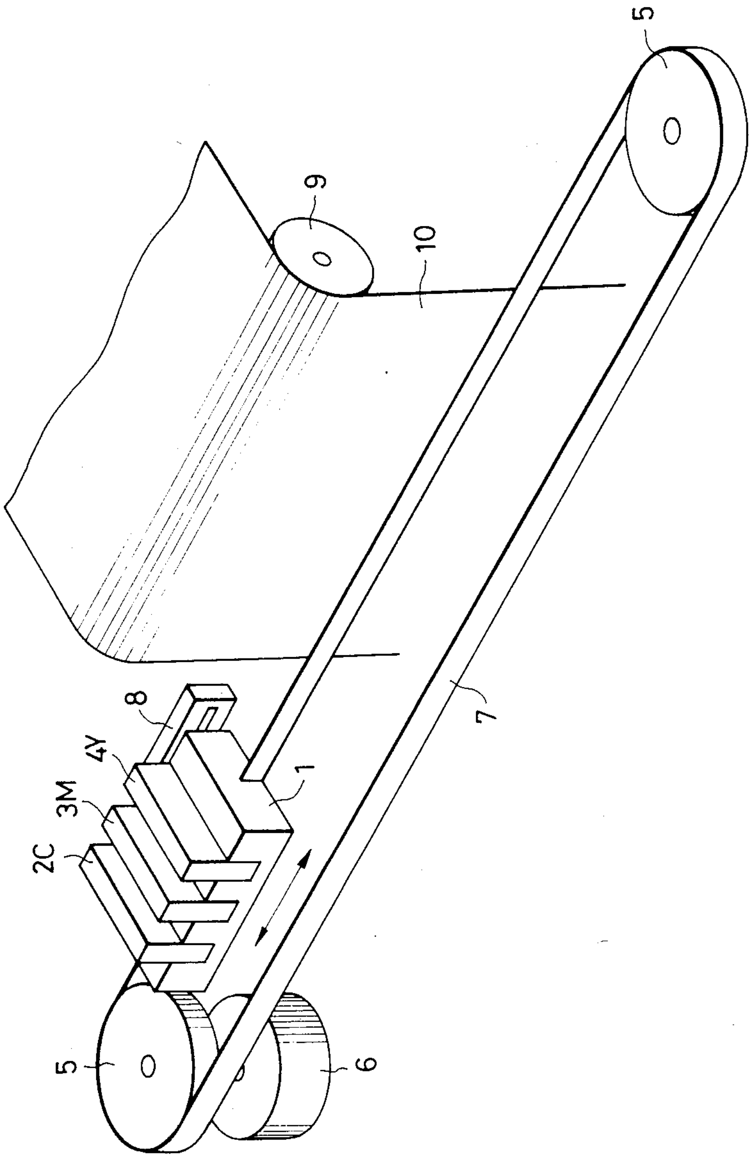
FIG. 1 is a perspective view of a principal part of a color printer embodying the present invention.

FIG. 1 is a perspective view of a color printer embodying the present invention, wherein a head carriage 1 carries a cyan head 2C, a magenta head 3M and a yellow head 4Y in predetermined positions. Each head is provided with ink orifices of a predetermined number arranged in a vertical direction and an ink tank, which is replaced when the ink in the ink tank is exhausted. There are also shown a pair of pulleys 5, a driving motor 6 linked to one of the pulleys, and a belt 7 mounted around the pulleys 5 and fixed to the head carriage 1.

A linear sensor 8, composed for example of a CCD, is fixed at a position opposite to the head carriage 1 in a standby state, and detects a reference mark on the head carriage 1 and the positions of the recording heads as will be explained later. There are further shown a platen 9 and a recording sheet 10.

Figure 2:
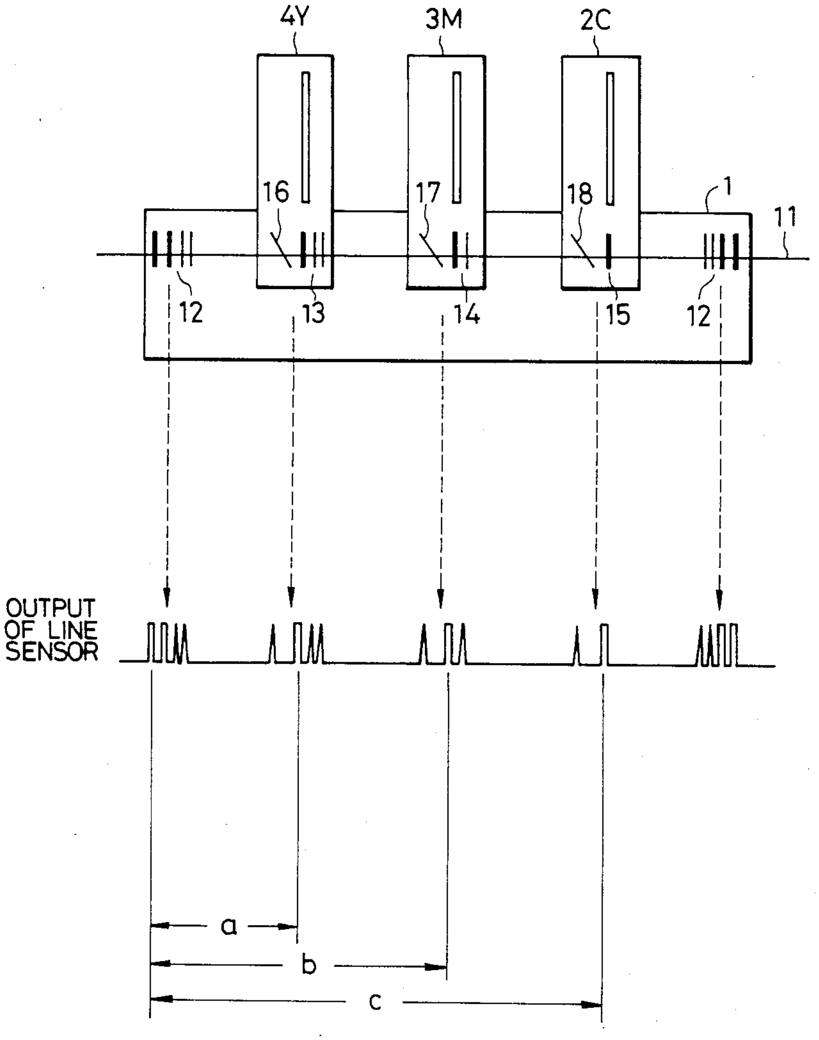
FIG. 2 is a view showing the relationship between a head carriage with recording heads mounted thereon and the output of a linear sensor.

FIG. 2 shows the relationship between the head carriage with the recording heads mounted thereon and the output of said linear sensor. Corresponding to a reading position 11 of the linear sensor 8, the head carriage 1 bears reference marks 12 on both ends of a face opposed to said linear sensor 8, and the recording heads bear registration adjustment marks 13 (head 4Y), 14 (head 3M), 15 (head 2C) and vertical position detecting marks 16 (head 4Y), 17 (head 3M), 18 (head 2C) corresponding to the reading position 11 of the linear sensor 8. The marks 13, 14, 15 indicate the positions of ink orifices on the recording heads. Said marks 13, 14, 15 are orthogonal to the line of reading position 11, while the marks 16, 17, 18 are diagonal to said line. Consequently, for example at initialization, the linear sensor 8 can detect distances a, b, c of the marks 13, 14, 15 of the recording heads from the reference mark, or the amounts of registration in the moving direction of the head carriage. The symbols a, b and c respectively indicate the amounts of registration of the heads 4Y, 3M and 2C in the lateral direction.

Figure 3:
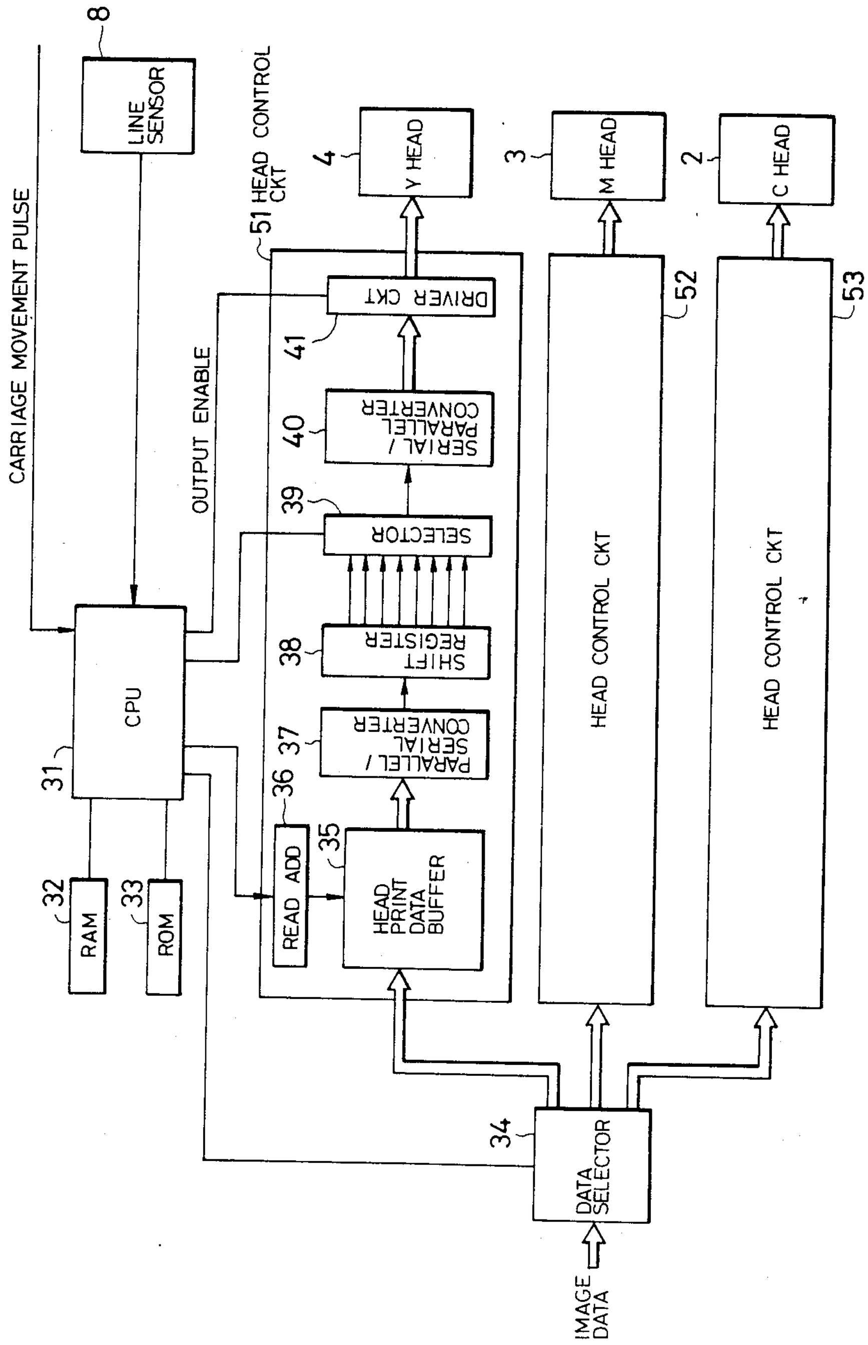
FIG. 3 is a block diagram of an electric circuit of an embodiment of the present invention.

FIG. 3 is a block diagram of the present embodiment, wherein a CPU 31, a RAM 32 and a ROM 33 store a program of a control sequence as shown in FIG. 4. A data selector 34 separates image data signal into respective color signals Y, M and C, and supplies each of thus separated color signals to a head control circuit of a corresponding color. It is to be noted that FIG. 3 only shows the details of a control circuit 51 for the yellow head, but does not show the details of the control circuits 52, 53 for other two colors since they are identical to the circuit 51. The yellow head control circuit 51 is composed of components 36–41 to be explained in the following.

A head print data buffer 35 stores image data of a corresponding color (Y) supplied from the data selector 34. A read-out address counter 36 selects a position of data read-out from the head print data buffer 35, in response to a control signal from the CPU 31. The head print data buffer 35 supplies, in parallel manner, the data of a position designated by the read-out address counter 36 to a parallel/serial (P/S) converter 37.

Serial data signal obtained from the P/S converter 37 is serially supplied to a shift register 38, then supplied in parallel manner to a selector 39 controlled by a control signal from the CPU 31, then serially supplied to a serial/parallel (S/P) converter 40, and supplied to a driver circuit 41 functioning in response to an output enable signal from the CPU 31.

In response to each output enable signal, the driver circuit 41 activates recording elements of the yellow head 4Y corresponding to the signal from the driver circuit 41, thus achieving a yellow print on the recording sheet.

The CPU 31 drives the head carriage 1 by means of the driving motor 6, which supplies the CPU 31 with a movement pulse for each movement, corresponding to a dot, of the head carriage in the scanning direction. The CPU 31 also receives the signal from the linear sensor 8, calculates the aforementioned values a, b, c in the form of numbers of movement pulses in an initializing step and stores said values in the RAM 32.

Figure 4A:
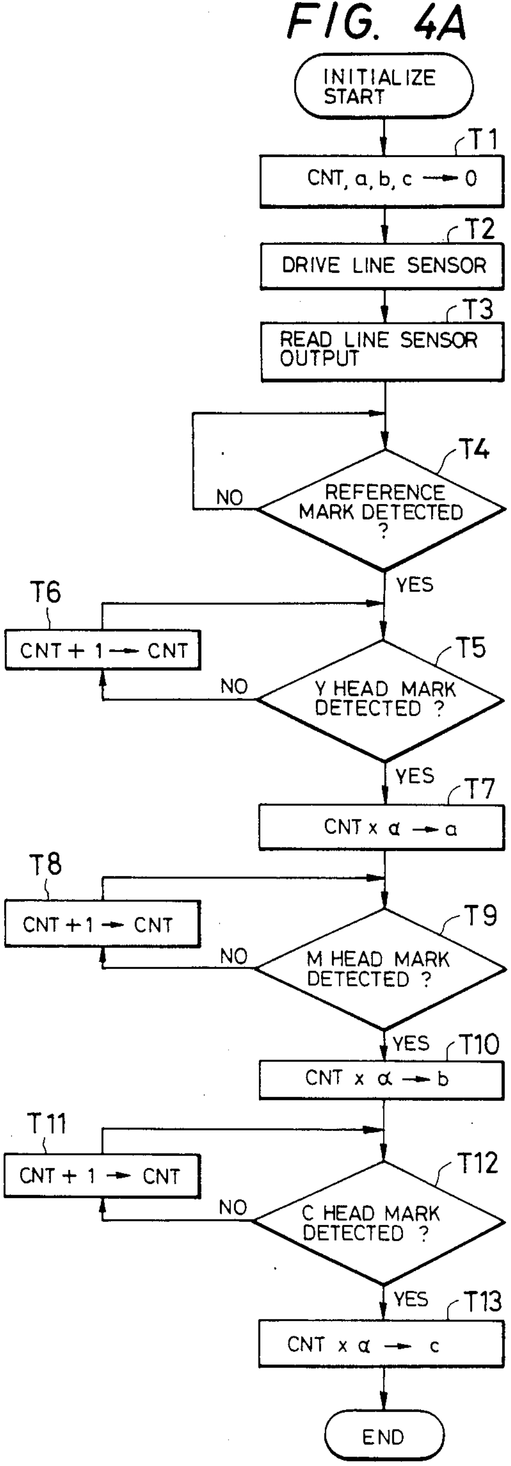
FIG. 4A is a flow chart showing an initializing operation.
Figure 4B:
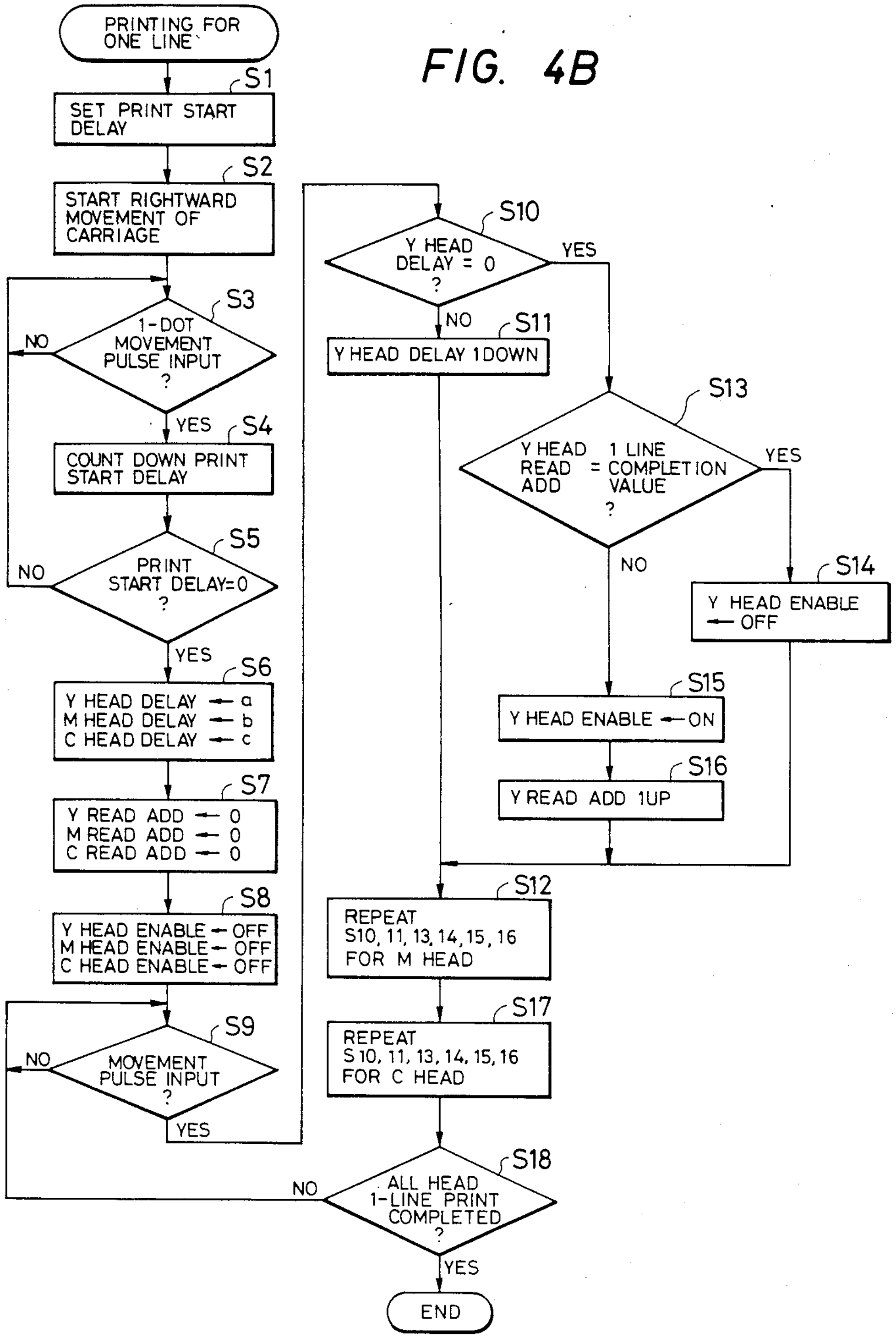
FIG. 4B is a flow chart showing a recording operation of a line.

In the following there will be explained, as examples of the functions of the above-explained embodiment, an initializing operation in relation to FIG. 4A and a printing operation of a line in relation to FIG. 4B. Programs corresponding to the flow charts shown in FIGS. 4A and 4B are stored in the ROM 33 shown in FIG. 3.

The initializing operation is conducted in the following manner. A step T1 initializes a counter CNT and the aforementioned values corresponding to head distances to zero. Then steps T2, T3 activate the linear sensor 8 and read the output thereof.

The counter CNT remains inactive until an output corresponding to the reference mark is obtained from the linear sensor 8. When said output is obtained (step T4), the value of the counter CNT is increased until there is obtained an output corresponding to the mark of the yellow head (steps T5, T6). When said output is obtained, a step T7 effects a calculation CNT x $\alpha$ in order to correlate the value of the counter CNT with the number of dots between the recording heads, and stores the result of said calculation, which is equal to the aforementioned value a, in the RAM 32.

Then the values b and c are determined respectively in steps T8 to T10 and T11 to T13 in a similar manner.

FIG. 4B shows a control sequence for effecting a recording operation, with compensations of the head distances, based on the values a, b and c determined in the above-explained manner.

After the initialization, a step S1 sets the number of movement pulses required for the reference mark of the head carriage 1 in the standby position to move to the printing position, as a print start delay, in the RAM 32. Then a step S2 starts the movement of the head carriage 1. A step S3 discriminates the entry of a moving pulse corresponding to a dot. If said pulse has not been entered, the program awaits its entry. If the pulse has been entered, it reduces the value of print start delay by a count and the program proceeds to a step S5.

The step S5 discriminates whether the value of the print start delay has reached zero. If not zero, the program returns to the step S3. If zero, the program proceeds to a step S6, whereupon the reference mark of the head carriage 1 moves to the print position.

The step S6 sets, in the RAM 36, a number of moving pulses corresponding to the distance a from the reference mark of the head carriage 1 to the ink orifice of the yellow head as the Y-head delay. It also sets, in said RAM 36, the number of moving pulses corresponding to the distance b as the M-head delay and that corresponding to the distance c as the C-head delay. Then a step S7 resets the pointers of the read-out address counters for the Y, M and C-heads to zero. Then a step S8 turns off the output enable signals for the Y, M and C heads.

A step S9 then discriminates the entry of a moving pulse. If not entered, the program awaits its entry. If a moving pulse has been entered, the program proceeds to a step S10 to discriminate whether the value of the Y-head delay has reached zero. If not, the program proceeds to a step S11 to decrease said value by one, and then proceeds to a step S12. If the value of the Y head delay is identified as zero in the step S10, the program proceeds to a step S13.

The step S13 discriminates whether the pointer of the read-out address counter for the Y-head has reached a value corresponding to the end of a line. If said value has been reached, a step S14 turns off the output enable signal for the Y head and the program proceeds to the step S12. On the other hand, if said value has not been reached, the program proceeds to a step S15 to turn on the output enable signal for the Y head, then to a step S16 to increase the pointer of the read-out address counter for the Y head by one, and to the step S12.

The step S12 executes a procedure for the M head similar to the steps S10, S11, S13, S14, S15 and S16. Then the program proceeds to a step S17 which executes a procedure for the C head similar to the steps S10, S11, S13, S14, S15 and S16.

A step S18 discriminates whether all the Y, M and C heads have completed the printing of a line, and, if not, the program returns to the step S9. On the other hand, if completed, the program is terminated.

As explained in the foregoing, the linear sensor 8 detects the distances a, b and c of the marks 13, 14 and 15 of the recording heads from the reference mark, and, after the reference mark of the head carriage 1 reaches the print position, the printing operation of each head is started upon receiving a number of moving pulses corresponding to thus detected value a, b or c. Consequently the head registration can be automatically adjusted, and can be easily achieved even when the recording head is replaced.

The above-explained embodiment allows automatic compensation of the errors in the registration of the recording heads by detecting the marks respectively provided on the recording heads and the reference mark provided on the head carriage and determining the distances of said marks from said reference mark, thereby improving the image quality.

In case of simply correcting the errors in mutual registration of the recording heads, it is only required to determine the mutual distances of the recording heads.

The present invention is not limited to the foregoing embodiment but is subject to various modifications and variations within the scope and spirit of the appended claims.

What we claim is:

1. A recording apparatus comprising:

plural recording heads;

a carriage on which said plural recording heads are mounted;

moving means for moving said carriage relative to a recording medium;

detecting means for detecting marks indicating the mounting positions of said recording heads; and means for generating a value corresponding to the position of each of said recording heads according to the detection output of said detecting means.

2. A recording apparatus according to claim 1, further comprising control means for controlling the timing of recording of each of said recording heads according to the values corresponding to the positions of said recording heads.

3. A recording apparatus according to claim 1, wherein said recording heads are replaceable.

4. A recording apparatus according to claim 1, wherein said carriage is provided with a reference mark which is also detectable by said detecting means.

5. A recording apparatus according to claim 4, wherein said generating means is adapted to generate signals indicating the distances between said recording heads and said reference mark.

6. A recording apparatus according to claim 1, wherein said plural recording heads are adapted to record respectively different colors.

7. A recording apparatus according to claim 6, wherein said recording heads of different colors are respectively replaceable.

8. A recording apparatus according to claim 1, wherein said detecting means includes a line sensor.

9. A recording apparatus comprising:

recording means for image recording, provided with a mark indicating the position thereof;

a carriage on which said recording means is mounted, said carriage being provided with a mark indicating the position thereof;

moving means for moving said carriage relative to a recording medium;

detecting means for detecting the marks of said carriage and said recording means; and means for generating a position signal indicating the position of said recording means on said carriage, according to a detection output of said detecting means.

10. A recording apparatus according to claim 9, further comprising control means for controlling the timing of recording of said recording means, according to said position signal.

11. A recording apparatus according to claim 9, wherein said recording means is replaceable.

12. A recording apparatus according to claim 9, wherein said recording means comprises plural recording heads respectively provided with marks indicating the positions thereof.

13. A recording apparatus according to claim 12, wherein said plural recording heads are adapted to record respectively different colors.

14. A recording apparatus according to claim 13, wherein said recording heads of different colors are respectively replaceable.

15. A recording apparatus according to claim 9, wherein said detecting means includes a line sensor.

* * * * *